United States Patent [19]

Soucie et al.

[11] Patent Number: 4,563,360

[45] Date of Patent: Jan. 7, 1986

[54] EDIBLE XANTHAN GUM-PROTEIN FIBROUS COMPLEXES

[75] Inventors: William G. Soucie, Gurnee; Wen-Sherng Chen, Glenview, both of Ill.

[73] Assignee: Kraft, Inc., Glenview, Ill.

[21] Appl. No.: 567,096

[22] Filed: Dec. 30, 1983

[51] Int. Cl.$^4$ ............................ A23J 3/00; A23L 1/00
[52] U.S. Cl. ..................................... 426/104; 426/574; 426/656; 426/657; 426/659; 426/802
[58] Field of Search ............... 426/104, 574, 802, 656, 426/657, 659

[56] References Cited

U.S. PATENT DOCUMENTS

| | | | |
|---|---|---|---|
| 3,455,697 | 7/1969 | Atkinson | 426/802 X |
| 3,627,536 | 12/1971 | Arima et al. | 426/802 X |
| 3,645,746 | 2/1972 | Akinson | 426/802 X |
| 3,792,175 | 2/1974 | Schmitt | 426/656 |
| 3,806,611 | 4/1974 | Sawada et al. | 426/802 X |
| 3,829,587 | 8/1974 | Tolstoguzov et al. | 426/574 |
| 3,842,062 | 10/1974 | Eastman | 426/583 X |
| 4,173,657 | 11/1979 | Gaudio et al. | 426/574 |
| 4,423,083 | 12/1983 | Shenouda | 426/574 |

FOREIGN PATENT DOCUMENTS 886486  1/1982  United Kingdom ............... 426/574

*Primary Examiner*—Robert Yoncoskie
*Attorney, Agent, or Firm*—Fitch, Even, Tabin & Flannery

[57] ABSTRACT

Methods and compositions are disclosed relating to fibers formed from xanthan gum and various protein sources such as soy protein, egg protein and casein, as well as simulated meat compositions utilizing such fibers.

18 Claims, 8 Drawing Figures

EDIBLE XANTHAN GUM-PROTEIN FIBROUS COMPLEXES

The present invention is directed to edible fibrous protein compositions suitable for utilization as simulated meat products and to methods for preparing such compositions. This application is related to our contemporaneously executed and filed application entitled "Fibrous Serum Milk Protein Complexes", which is incorporated herein by reference.

Substantial technological effort has been directed to the preparation and utilization of edible synthetic protein fibers, particularly including synthetic protein fibers of vegetable origin such as soy protein fibers. In this regard, efforts to provide synthetic meat textures have conventionally included preparative methods comprising the extrusion or spinning of vegetable protein solutions or various protein-polysaccharide combinations to form meat-like fibers, such as described in U.S. Pat. Nos. 2,682,466, 3,093,483, 3,627,536 and 4,118,520.

Substantial effort has also been directed to the study of complexes of proteins with other polymeric components including various polysaccharides. For example, alginates have been complexed with proteins including casein, edestin, yeast protein, gelatin and soy protein. Gelatin, bovine serum albumin, lysozyme and soy proteins have been complexed with sodium dextran sulfate, sunflower seed albumin has been complexed with alginate or pectin, and whey protein has been recovered from whey through the use of various hydrocolloids. Soybean whey-gum fibers are also known, and it is also known that certain proteins will form fibers in the presence of specific polysaccharides, as disclosed in U.S. Pat. No. 3,792,175. However, such conventional procedures and fiber systems are limited in protein or gum utilization, and methods for providing novel protein complexes which may be utilized in the manufacture of quality simulated meat products would be desirable.

As reported in "Filaments From Proteins", M. P. Tombs, Plant Proteins, G. Norton, Butterworth, Boston (1978), pp. 283-288, the ideal filament forming process would probably be one where a solution of the protein, after minor manipulation, spontaneously separates to yield filaments, preferably in ordered arrays, but there have been difficulties in providing such processes in which typical proteins of the sort available for filament production will show self-assembly to form filaments, because vegetable proteins that exhibit self-assembly properties tend to form spherical particles.

Accordingly, it is an object of the present invention to provide methods for the manufacture of novel protein-complex fibers from proteins such as soy protein, which have desirable flavor and texture characteristics. It is a further object to provide novel meat-stimulating protein compositions. These and other objects of the invention will become apparent from the following detailed description and the accompanying drawings of which:

Figure 1:
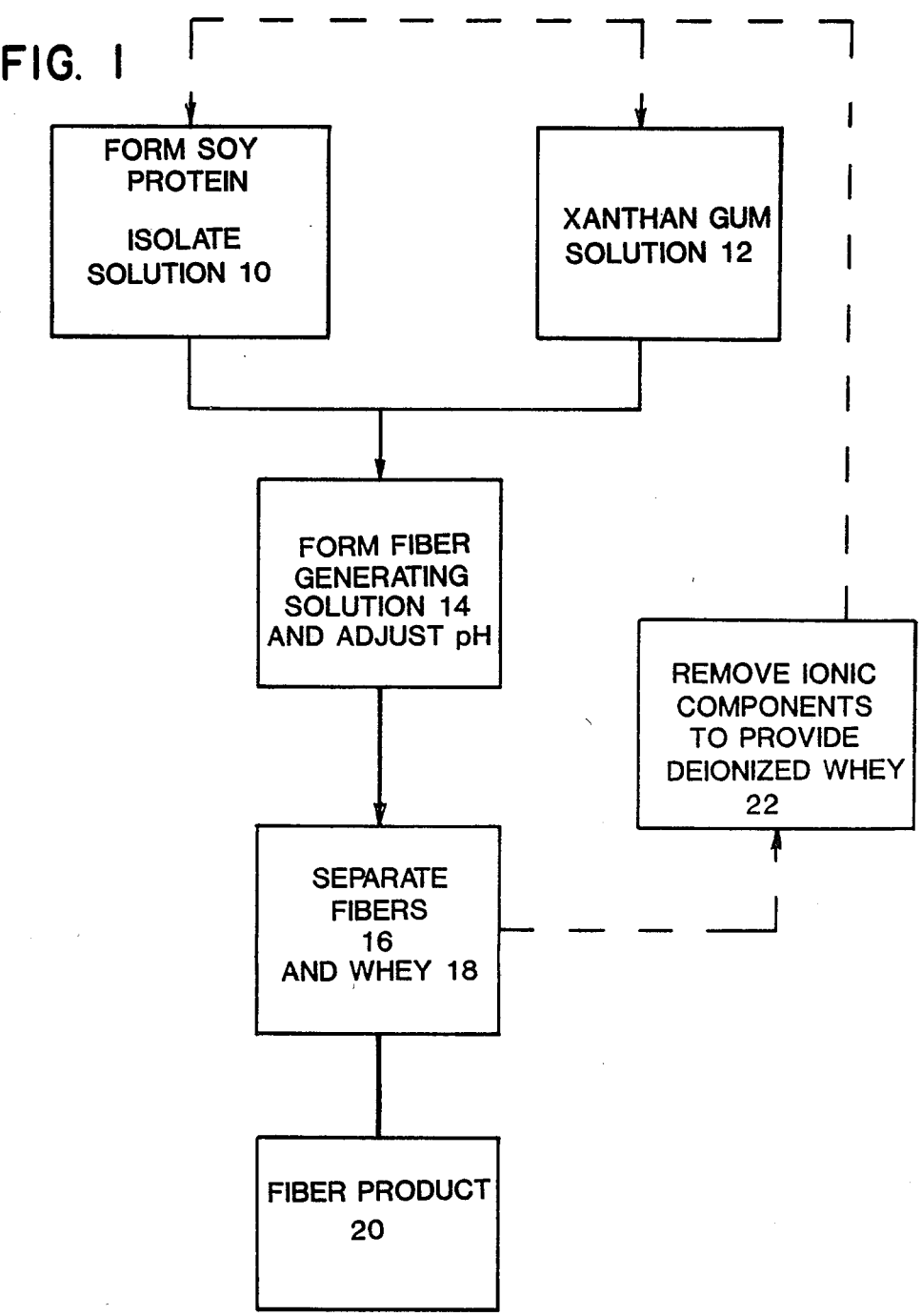
FIG. 1 is a schematic diagram illustrating an embodiment of an xanthan-gum soy protein isolate fiber manufacturing method.

Generally, the present invention is directed to methods for manufacturing edible protein-xanthan gum complex fibers, and to specific protein-xanthan gum fiber compositions having meat-like body and texture. Various aspects of the invention are further directed to methods for stabilizing the integrity of such fibers, particularly in the presence of added flavoring agents which adversely affect the integrity of the fibers. Additional aspects of the disclosure are directed to meat simulating compositions including those having particularly desirable properties such as whiteness and/or firmness levels simulating particular meat products.

In accordance with various aspects of the present disclosure, methods for edible protein fiber manufacture are provided comprising the steps of providing an aqueous protein fiber generating solution comprising a solubilized edible protein polymer component selected from the group consisting of soy protein (particularly including soy protein isolate), casein, egg protein, peanut protein (particularly including peanut protein isolate), cottonseed protein (particularly including cottonseed protein isolate), sunflower protein (particularly including sunflower protein isolate), pea protein (particularly including pea protein isolate), and mixtures thereof. These solubilized protein components should comprise at least about 80 weight percent of the solubilized proteins, based on the total weight of the solubilized protein. The fiber generating solution further includes a solubilized xanthan gum hydrocolloid polymer component selected from the group consisting of xanthan gum, xanthan gum/hydrocolloid adducts and mixtures thereof. Soy protein isolate and mixtures of soy protein isolate and egg albumin are particularly preferred edible protein polymer components. By "solubilized protein" is meant a protein that is hydrated by existing either in true solution (single phase) or in a stabilized dispersion which upon initial dispersion in water may appear to be a single phase but after a period of time may separate into two phases. The edible protein polymer component will desirably have an isoelectric point(s) greater than about 3, preferably in the range of from about 4 to about 10. Particularly useful proteins may have an isoelectric point in the range of from about 4 to about 7. In this regard, typically soy protein isolate may have an isoelectric point of about 4.5, egg albumin of about 4.7 and casein of about 4.5. It is noted that various constituents of the solubilized edible protein component may have different isoelectric points. However, it is important that the isoelectric point of the various protein components when complexed with the xanthan gum component form fibrous precipitates in the provision of multiple protein fibers at a preselected reaction pH which is determined by the isoelectric point of the fibrous complex. In this regard, particularly preferred compositions in accordance with the present invention include multiple protein complex fibers such as soy protein-egg albumin-xanthan fibers.

A protein is desirably solubilized at a pH of at least about 1 pH unit from its isoelectric point, and preferably at 2 pH units or greater from its isoelectric point. By "soy protein isolate" and "peanut protein isolate" is meant a protein preparation containing about 90% protein. By "soy milk" is meant a white or creamy emulsion made by grinding whole soybeans. A variety of processing schemes are conventionally practiced to provide soy milk. By "xanthan gum" is meant the heteropolysaccharide produced by fermenation of the microrganism of the genus Xanthomonas. A discussion of the physical and chemical properties may be found in Industrial Gums, R. L. Whistler, Ed., Academic Press, N.Y. (1973), p. 473.

Xanthan gum in aqueous solution with an appropriate counterion such as sodium is highly negatively charged because its side chains are composed of charged glucuronic acid, mannose and its pyruvate derivative as shown in the following structure:

but maintain the relative linearity of the molecules which may be a factor in the fibrous precipitation with the selected protein polymers. By xanthan gum adduct is meant a complex of Xanthan gum with another hydrocolloid.

Xanthan gum forms adducts with other hydrocolloids such as carob gum in which it is believed that the extended linear nature of the xanthan gum in solution is preserved. Desirably, the xanthan gum adducts should comprise at least about 60 weight percent of xanthan gum, based on the total weight of the xanthan gum and the adduct component.

As will be discussed in more detail hereinafter, the protein fiber genetrating solution may be provided in any suitable manner, as by preparing and subsequently combining separate protein components and xanthan gum polymer solutions, and by initially preparing a solution comprising both components. Further in accordance with the present disclosure, the fiber generating solution should contain a solubilized protein component and xanthan component in a particular range, and in this regard, the total solubilized protein and xanthan components should be in the range of from about 0.1 weight percent to about 4 weight percent, based on the total weight of the aqueous fiber generating solution. At lower values, the xanthan gum-protein solution mixture precipitates while at higher values, the mixture forms a thick slurry rather than a product having a meat-like fibrous texture.

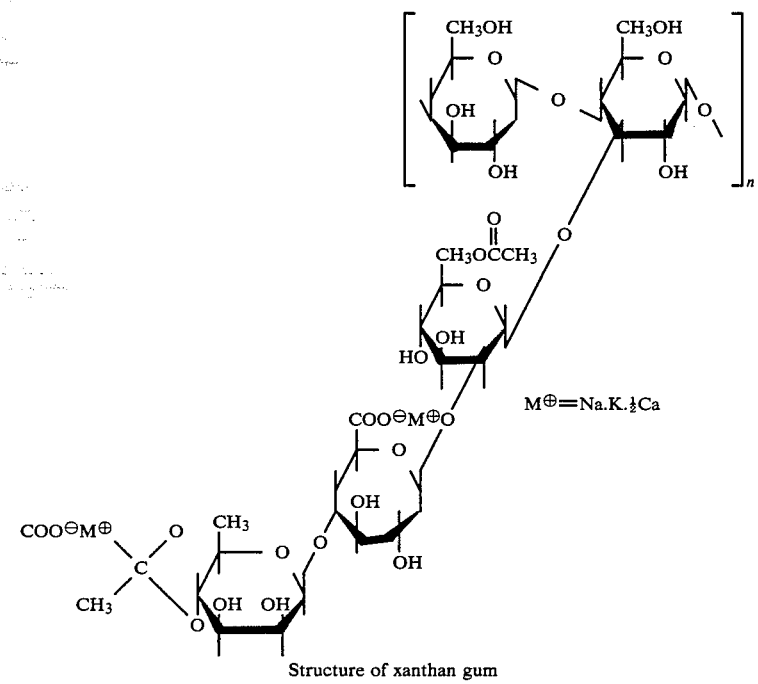

Structure of xanthan gum

In aqueous solution, the highly charged mutually repelling and relatively bulky side chains, which are regularly disposed along the relatively narrow backbone, are believed to provide the xanthan with a relatively linear structure, which is further believed to be an important factor in the provision of fiber complexes in accordance with the present invention. In the three-dimensional structure of xanthan gum, the charged sugar moieties on the side chains of the gum project away from the gum's backbone in the center and so are not only accessible to proteins for electrostatic interaction, The aqueous fiber forming solution may further include other components, including other dissolved or suspended protein components, flavoring agents, preservatives and hydrocolloids. However, the amount of such components should not exceed the total amount of the specified protein component and the xanthan gum component, and in any event, such additional materials should not be included in amounts which significantly interfere with or prevent fiber formation, as will be discussed in more detail hereinafter.

Further in accordance with the method, the pH of the fiber generating solution is adjusted to a pH at which the components form a complex, which is preferably within about 2 pH units of an optimum isoelectric pH for the desired complex, to form a fibrous protein-polysaccharide complex under conditions of mixing of the fiber forming solution.

In this manner, hybrid protein complexes may be formed which have a fibrous-meat like texture. The fiber formation may occur over a range of pH approaching the isoelectric point of the particular xanthan gum-protein complex. In this regard, for example, for a soy protein isolate-xanthan gum fiber complex formation, fiber formation may begin near neutral pH and increases as the pH is adjusted to or near to the isoelectric point of the hybrid soy protein-xanthan gum complex, which typically may be in the range of from about 1 to about 5. The fiber formation is spontaneous and does not require the use of spinning equipment. Once the fibers are formed, they are relatively stable to a range of salt and pH conditions, with various limitations as will be more fully discussed hereinafter. Moreover, the fibrous network synereses (exudes water), which is desirable in the minimization of energy intensive drying steps. The fibers under some conditions may be less dense than the aqueous phase and thus float to the surface for harvesting by skimming the surface of the reaction vessel or draining away the aqueous phase from below such as in a stanard cheese vat. The separation of the fibrous hybrid protein complexes from the liquid phase, which may contain low molecular weight solutes, effectively removes salts from the protein-complex while at the same time concentrating the protein component.

The adjustment of pH to form fibers from the xanthan gum-protein mixture may be carried out in a variety of ways. In this regard, the protein fiber generating solution may be provided at a pH significantly above the isoelectric point of the protein complex fibers, and subsequently reduced in pH toward its isoelectric point. This pH reduction may be carried out for example by removal of a cationic counterion (e.g., Na+) of the solubilized xanthan gum and/or protein component as by electrophoresis, or by addition of an edible or food grade acid such as hydrochloric acid, phosphoric acid, acetic acid, citric acid, ascorbic acid, carbonic acid or mixtures thereof. The acid appears to protonate both the carboxylate and the amino groups of the protein to make the protein less negatively charged so as to link the polymeric chains of the very negatively charged xanthan gum, to form a gum protein complex that has a fibrous network. Adjustment of pH may also be carried out by other appropriate techniques such as by combining an aqueous solution of the protein component at a predetermined pH at which the protein component is solubilized with an aqueous solution of the xanthan gum component at a predetermined pH at which it is solubilized, such that upon combination the resulting solution has a predetermined pH at or near the isoelectric point of a desired protein-xanthan gum fibrous complex. In this regard, it will be appreciated that the protein component may be provided in aqueous solution in broad ranges of pH at higher and lower pH than its protein isoelectric point(s), and the xanthan gum, which has substantially only anionic carboxylic groups may also be provided in aqueous solution over a broad range of pH. It will also be appreciated that the pH may be adjusted by selective anion removal from a combined solubilized protein and xanthan component solution having low pH, in order to raise the pH to a value approximating the isoelectric point of a desired protein component-xanthan gum fibrous complex, or an edible food grade base, such as sodium hydroxide may be added to such solubilized acidic mixtures.

The fibrous complex reaction is completed or maximized when the gum-protein mixture is adjusted to a pH at which the electrophoretic mobility of a desired gum-protein mixture is substantially zero. Electrophoretic mobility may be measured using conventional analytical instruments such as a System 3000 electrokinetic analyzer manufactured by PenKem, Inc., Bedford Hills, N.Y.

Because the salt balance affects the electrical charge on the protein and xanthan gum, and because the electrical charge on these polymers affects their interaction with each other, the manipulation of molecular electrokinetic properties is important to the control of the texture of their complex interaction product. By adjusting the pH of the fiber generating solution containing two or more protein and xanthan polyelectrolytes of opposite principal polarity, so that the pH is below the isoelectric point of at least one of the polyelectrolytes, a reaction among the various polyelectrolytes may be carried out, particularly when the net charge of the electrolyte with high pI is positive and that of the other polyelectrolyte is negative. Although it is desirable that opposite net charges be achieved, it is not required. A desirable reaction will take place when the reacting species are like-charged but the charge is reduced to the extent that electrostatic repulsions are overcome in order to allow the reaction to take place.

The isoelectric points of the specified protein component and the xanthan gum component may have widely different values, for example, the isoelectric point of a soy protein isolate component may typically to about pH 4.4, while xanthan gum, because it may have substantially only pendant anionic carboxylic acid ionic species, has an effective electrical charge even at pH 1. Soy protein isolate-xanthan complexes will have intermediate isoelectric points, depending upon the relative proportions of each in the complex. Optimal points for hybrid complex formation may be determined by measuring the isoelectric points of desired complexes, which may be carried out by measuring the isoelectric point values separately for the reactants, and adjusting the mixture pH to a value intermediate to the individual pI to form a sample of the desired complex. The pI of the complex thus formed may be measured to determine a desired pH for the complex formation as the control point of the reaction to maximize product yields and achieve the desired fibrous food texture. It will be appreciated, as will be further discussed, that the isoelectric point of a protein-xanthan complex may vary depending upon the respective proportions of the components of the complex.

The shape and size of the gum-protein fibers may be controlled by the degree of shear or mixing applied to the fiber forming solution during pH adjustment. For example, long, large and nonordered fibers may be manufactured under conditions of relatively low shear mixing, while short, fine and uniform fibers may be obtained under conditions of relatively high shear mixing during adjustment of the solution pH to the desired fiber-forming value. The rate of pH adjustment, as by acid addition, to form the complexes can vary to a great extent. For example, fibers have been formed by batch addition of the acid to the reaction vessel as well as by slowly metering in the acid. Acid addition may be adjusted to accommodate the reaction scheme.

Complexed xanthan gum-protein fibers in accordance with the present disclosure are stable in acidic and neutral media, but may be dissolved in an alkaline solution (i.e., pH 9.0 or higher). The stability of the fibers and their texture may be modified by heat treatment, as will be more fully discussed hereinafter.

The texture of the gum-protein complex may be controlled by varying the ratio of the gum versus the protein. As indicated, the desired xanthan gum to protein weight ratio is within the range between 1:4 and 1:10. If the ratio is higher than 1:4, the complex will be too gummy (i.e., too much gum characteristic), while if the ratio is lower than about 1:10, the complex will lack fibrous texture. Percentages given herein are weight percentages, and ratios are weight to weight ratios unless otherwise indicated.

As also indicated, the ionic strength of the fiber-forming solution is an important parameter in respect to fiber formation, and in this regard, should be less than about 1M, and preferably should be in the range of from about 0M to about 0.1M. By "ionic strength" is meant the concentration of mobile ions and is defined by the following equation:

$$\mu = \tfrac{1}{2} \sum_{i=1}^{n} C_i Z_i^2$$

where $\mu$=ionic strength, $C_i$=molar concentration of ion i and $Z_i$=valency of ion i, and n is the number of different cationic and anionic species. In many cases it is difficult to calculate the ionic strength. The difficulty is alleviated by measuring the specific conductance of the solution. The specific conductance of the solution is the reciprocal of its electrical resistance between opposite sides of a cube, one centimeter in each direction. The unit of specific conductance is mho cm$^{-1}$ or ohm$^{-1}$ cm$^{-1}$. The specific conductance of the reaction mixture may desirably be less than about 0.09 mho cm$^{-1}$, and preferably should be in the range of from about 0.0004 to about 0.002 mho per centimeter.

It is noted that salt components contributing to ionic strength of the fiber generating solution may be introduced directly, or indirectly as counterions to solublize the protein component and the xanthan gum component and during adjustment of pH of fiber generating solution as by addition of an acid or base to the solution. For example, the formation of xanthan gum-soy protein isolate fibers may be prevented in the presence of 1.0 molar sodium chloride in the fiber generating solution. This indicates that the ions interfere with the electrostatic interaction between the xanthan gum and the soy protein isolate. In contrast, at low concentrations of sodium chloride such as in the range of from about 5 to about 10 millimole concentration in the fiber-forming solution, the gum and the protein may form tougher, less gummy and drier meat-like fibers than those prepared without addition of sodium chloride.

A typical procedure for preparing the fibers of xanthan gum-soy protein complex may be described as follows: (1) suspend soy protein isolate in water, (2) add xanthan gum into the soy protein suspension with stirring until all the gum is dispersed to form a thin slurry comprising 2 weight percent total solids content of a desired ratio of the gum vs. the protein (e.g., 1:4 to 1:10 gum/protein weight ratio), (3) acidify the gum-protein mixture (with 1M HCl or other acids) to the pH where the electrochemical potential of the gum-protein mixture is substantially zero to generate fibrous gum-protein complex which floats to the top of the reaction vessel, (4) separate the fibers from the whey and wash them with water, centrifuge or press them by a cheese press to obtain fibers containing about 80 weight percent moisture.

Having generally described protein fiber manufacture, various aspects of the invention will be further described with respect to methods illustrated in FIG. 1. As shown in FIG. 1, an aqueous protein solution such as a soy protein isolate solution 10 may be prepared from a commercially available soy protein isolate such as Soy 270A manufactured by Kraft, Inc. at a level of 3.6 weight percent, and having a solution pH of about 7.0. Similarly, a xanthan gum solution 12 may be prepared by dissolving Keltrol xanthan gum, a product of Kelco, Inc. at a level of about 0.6 weight percent. The solutions 10, 12 may be combined in desired ratio to provide a fiber generating solution 14 having about 2 weight percent total solids and a pH of about 6.6.

The pH, ionic strength, gum/protein ratio, percent total solids, temperature, mode of mixing and stirring and rate of acidification are important factors for synthesizing fibers of xanthan gum-protein complexes, utilizing the fiber generating solution 14. Such pH adjustment may be carried out by addition of hydrochloric acid to neutralize in part the carboxylates of the protein and the gum so that the repulsion between the two polymers can be minimized. Then, electrostatic interaction and other bondings such as hydrogen bonding, hydrophobic bonding and van der Waals' forces between the two polymers can take place to provide fibers 16 and a whey phase 18 which may be separated by appropriate means.

However, in the presence of relatively high ionic strength (e.g., high salt solution), xanthan gum and soy isolate (for example 2 weight percent total solids of one to four gum/protein ratio in 1.0M NaCl) fail to form fibers, suggesting that the fiber formation is initiated by electrostatic attraction, and that the salt competes with the ionic binding sites of the two polymers.

The weight percent total solids of the fiber generating gum/protein solution 14 in water may be varied within the range of from about 0.1 weight percent to about 4 weight percent. If the weight percent of total dissolved xanthan-protein solids is lower than about 0.1 weight percent, the complex precipitates without proper fiber formation. On the other hand, if the weight percent of such dissolved solids is higher than about 4%, the gum-protein mixture forms a thick slurry, again without proper fiber formation. The water content of the fiber generating solution is critical for the two polymers to form a cross-linked polymeric network.

The temperature of the protein-gum interaction as carried out is also important. A high temperature is not generally desired for forming the fibers of the xanthan gum-soy protein complex. Softer and finer fibers may be obtained when the gum and the protein are heated to or above 70° C. before the two polymers were mixed and acidified. It may be that higher temperatures tend to change the conformation of the xanthan molecule from a rigid rod to a random coil, thereby adversely affecting fiber formation, but in any event, fiber formation should be carried out at a temperature of from about 4° C. to about 100° C.

The mode of mixing or agitation of the fiber-forming solution while carrying out the pH adjustment is also an important factor in formation of fibers. Different types of blades and/or different speeds of stirring may be utilized to provide different shapes and sizes of fibers. For example, large, long fibers may be obtained by using a Hobart blender at a slow speed (e.g., 90 rpm) while acidifying the fiber-forming solution. On the other hand, fine, short fibers may be obtained while stirring the gum-protein mixture in a Waring blender at a medium speed upon acidification.

The rate of acidification of the fiber-forming solution is a further important factor affecting fiber formation. In this regard, a relatively slow rate of acidification of the mixture of xanthan gum and soy protein is preferred for generating fibers. Addition of all the required amounts of acid into the gum-protein mixture at once may produce a gummy and slightly slimy fibers, perhaps because too rapid addition of acid causes gum molecules to coat the surface of the protein. One ml per minute of 1M HCl for three liters of a one to six weight ratio of xanthan gum to soy isolate mixture at a 2 percent weight concentration in water provides reasonably good fibers. These factors are considered as statistical variables for synthesizing fibers, and their optimization and interaction has been studied by statistical design. The whey 18 separated from the fiber composition 16 may contain inorganic salts resulting from the pH adjustment step, and may contain some unreacted xanthan gum or other components. The inorganic salts may be removed, at least in part, to provide a deionized whey 22, which may be utilized in the provision of the protein and gum solutions 10, 12. The fiber composition product 20 has a distinct fibrous character.

Figure 2A:
FIG. 2A is a scanning electron micrograph, at a magnification of 500×, of an embodiment of a fibrous xanthan gum-soy protein isolate complex in accordance with the present invention which is prepared by a method such as that illustrated in FIG. 1.
Figure 2B:
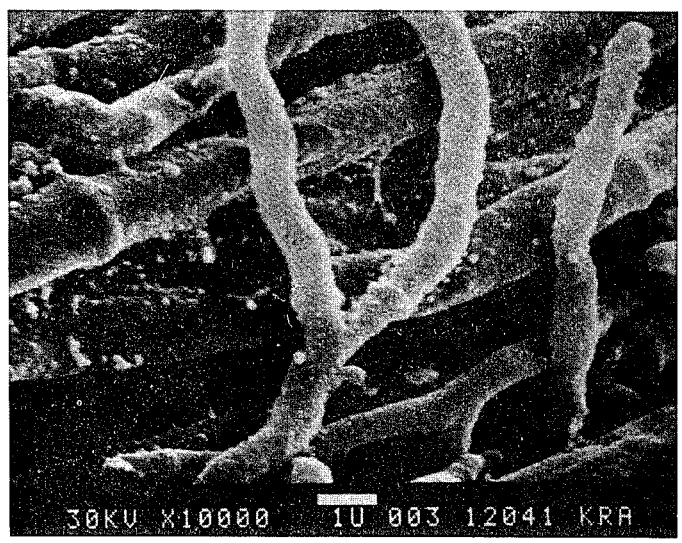
FIG. 2B is a scanning electron micrograph of a portion of the fiber complex of FIG. 2A, at a magnification of 10,000×.

The shape and size of an individual fiber of the xanthan gum-soy isolate (1:4) complex was observed in the scanning microscope micrographs as shown in FIGS. 2A and 2B. The electrophoretic mobility of the soy xanthan fiber composition may also be examined. The electrophoretic mobility pH curves (FIG. 3) of the fibrous xanthan gum-soy protein complex before and after lyophilization could be superimposed, indicating that the freeze-dried fibers will regain their surface-charge property after they are rehydrated.

Although the method of FIG. 1 has been particularly described with respect to soy protein-xanthan gum complex fibers, other water soluble proteins may also be utilized to form meat-like fibers. In this regard, for example, casein such as provided by skim milk powder or as sodium caseinate, other vegetable proteins such as peanut protein isolate and egg albumin, such as provided by egg whites, may be utilized as the solubilized protein component to form fibrous hybrid protein complexes in accordance with the present disclosure. These complexed xanthan gum-protein fibers are relatively bland and they differ in color and texture. For example, casein-xanthan fibers are white and tough while peanut protein isolate and soy protein-xanthan gum fibers are somewhat softer than the casein-xanthan fibers.

A particularly desirable feature of the present disclosure is that several proteins may be utilized with xanthan gum to form multiple protein-gum complexes. For example, the fibrous ternary complexes of casein-xanthan gum-soy protein isolate may be provided in which the ratio of the protein components is varied to provide desired fibrous products having a corresponding variety of characteristics. As also indicated, the solubilized xanthan gum component may comprise an xanthan gum adduct such as by fibrous hybrid protein complexes by mixing xanthan gum with other gums such as carob gum. Desirably, the different gums are first blended together and are subsequently blended with a protein to provide a fiber-forming aqueous solution. The multiple gums may be combined with a solubilized protein component in the desired weight ratio to form a fiber generating solution of the components, which may then be acidified under moderate shear conditions to generate a multiple gum-protein complex having a meat-like fibrous texture. Such xanthan-polysaccharide blends may be selected not only for reasons of economy to minimize the cost of the xanthan gum component of the resulting product, but also to vary the texture of the fibers. Similarly, fibrous multiple gum-multiple protein complex fibers may be prepared by using the appropriate starting components.

Utilization of various protein components and component blends permits manufacture of synthetic meat-like protein fibers which differ in color, firmness and flavor depending on components and processing variations. For example, sodium caseinate and xanthan gum form bland, firm and white fibers while soy protein forms softer and slightly less white fibers. It is an important and desirable characteristic that the fibers of the xanthan gum-soy protein complex are relatively bland and may be characteristic of the soy isolate protein. Ternary and higher complexes of soy protein and other proteins such as casein and/or egg protein with xanthan gum further reduce characteristic vegetable protein flavors.

Upon formation, the complexed gum-protein fibers may be readily separated from the remaining aqueous phase component in any suitable manner, as by filtration or centrifugation. For example, such fibers may be harvested by separating them from the aqueous phase, washing them with water, and pressing them in a cheese-press to provide meat-like fibers that contain generally from about 65 to about 80 weight percent moisture, and typically about 65 percent by weight moisture. The press dried fibers may be flavored by immersing them in a suitable favoring agent such as lobster, crab, chicken or beef extract to obtain desired, chewable meat-like products having meat simulating flavor and texture.

At acidic pH, the basic groups of the protein, namely the lysine, arginine and histidine residues are protonated and positively charged. In contrast, the xanthan gum is still negatively charged at the reaction or interaction pH. As a result, the gum and the protein interact spontaneously by electrostatic attraction which is controlled by the pH, the ionic strength, the isoelectric point of the protein and the pKa of the gum.

Figure 3:
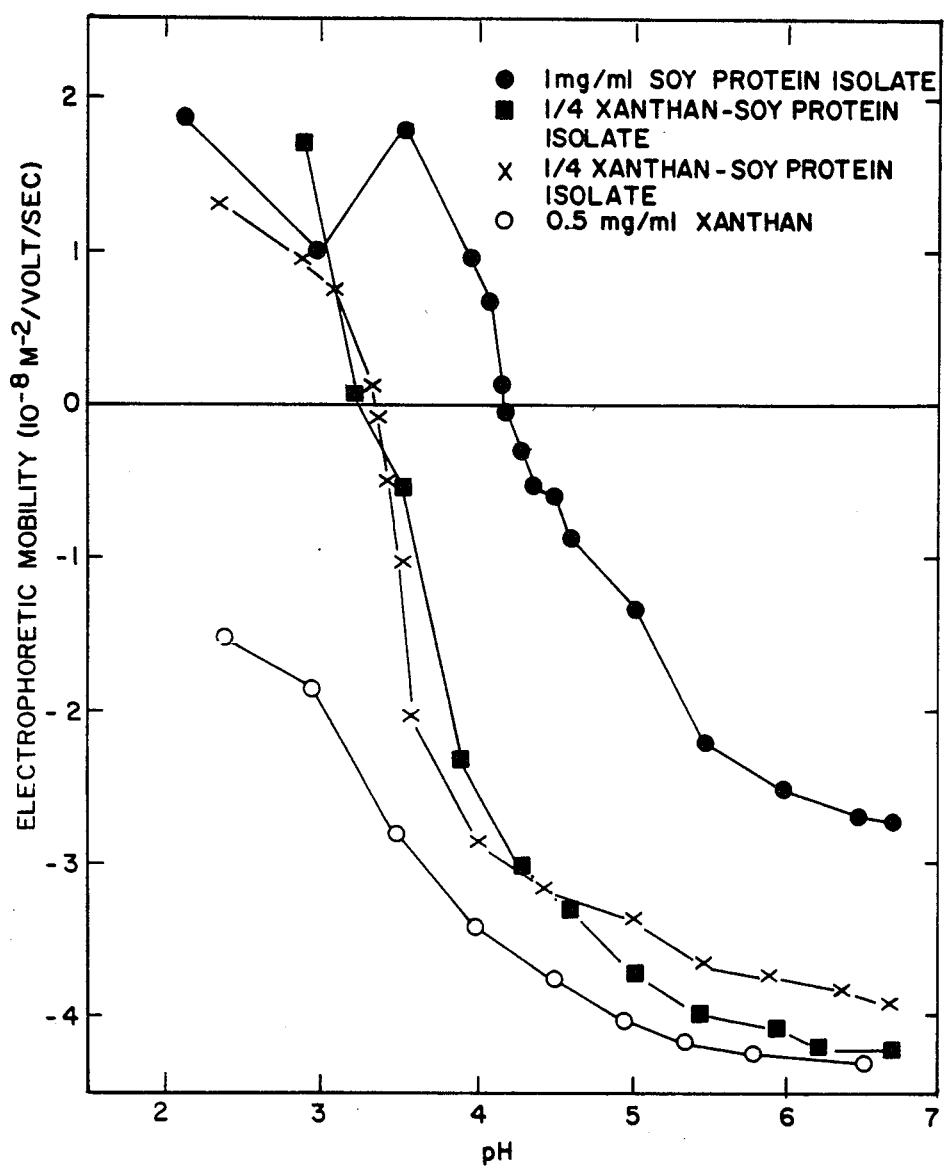
FIG. 3 is an electrophoretic mobility versus pH curve of an embodiment of fibrous xanthan-soy protein complex like that illustrated in FIG. 2, before and after lyophilization.

As indicated, the three-dimensional structure of solubilized xanthan gum is believed to be an important factor in fiber formation in accordance with the present disclosure. In this regard, the high negativity and reactivity to bind soy and other proteins is demonstrated by the electrokinetic analysis which is shown in FIG. 3. The electrophoretic mobility-pH curves of FIG. 3 show that the soy protein isolate becomes more negatively charged in the presence of xanthan gum because the electrochemical potentials of the soy protein are increased even at the neutral pH's region and its isoelectric point is lowered as a function of xanthan gum added. These changes in the surface charges of the protein indicate that the gum and the protein can interact strongly to form a complex by electrostatic attraction.

The fibers of xanthan gum-soy protein complex tend to soften and become slightly slimy above pH 5.5 perhaps because the gum-protein complex is very negatively charged and has more charge characteristics of xanthan gum at or above pH 5.5. An important feature in accordance with the present invention is that the softening and the sliminess may be prevented if the fibers were boiled in water at the isoelectric point of the gum-protein complex for a few minutes. It appears that the treatment denatures the protein or the complex as a whole so as to prevent the dissociation and/or dissolution of the gum-protein complex. Such heat treatment may liberate some flavor component characteristic of the starting protein, but this can be corrected or minimized by boiling the fibers in the presence of a thermostable meat base or other flavoring agents.

As indicated, methods in accordance with the present invention may be utilized to synthesize fibrous hybrid protein complexes containing a plurality of various kinds of proteins, and a plurality of various kinds of gums. For example, xanthan gum-soy isolate-whey protein and xanthan gum-soy isolate-sodium caseinate ternary complexes may be prepared by mixing the two proteins first before xanthan gum was added and then acidifying the gum-protein mixture. Similarly, a ternary complex of xanthan gum-soy protein isolate-zein may be prepared by dispersing xanthan gum in a soy suspension first and then mixing it with a suspension of zein in 85% isopropanol solution (the zein being insoluble in water). The gum-protein mixture may then be acidified as usual. The protein complexing agent may also comprise suitable hydrocolloids in addition to xanthan gum. In this regard, for example, carob gum is very inexpensive compared to xanthan gum and is demonstrated to have strong interaction with xanthan gum. Fibrous ternary complexes of soy protein isolate, xanthan gum and carob gum may be prepared by mixing the two gums to form an aqueous suspension, and subsequently adding the desired protein.

As indicated, protein-xanthan gum complex fiber formation is controlled by pH, ionic strength, gum/protein ratio, percent total solids and temperature. The interaction of these variables has been examined by experiments based on a factorial design.

There are many controlling factors for generating protein-xanthan gum fibers. Therefore, a statistical experiment with a factorial design was used to optimize the condition for producing fibers.

The first statistical experiment for preparing protein-xanthan gum complexes was conducted by using a 32 run central composite design based on five selected variables, designated X1–X5, respectively, of pH (X1), temperatures (X2), percent total solids (X3), ionic strength (X4) and gum/protein ratio (X5). Only six of the runs in this experiment produced fibers. Table 1 presents the data obtained from these runs, while Table 1A represents the statistical variability of the selected variables for the study.

TABLE 1

| Run | pH (X1) | Temp. (°C.) (X2) | % T.S. (X3) | Ionic Strength (X4) | Protein Gum-Ratio (X5) | Yield %* (y) |
|---|---|---|---|---|---|---|
| 1 | 4.0 | 60 | 1.9 | 85 | 0.15 | 0 |
| 2 | 4.5 | 42.5 | 2.8 | 125 | 0.10 | 0 |

TABLE 1-continued

| Run | pH (X1) | Temp. (°C.) (X2) | % T.S. (X3) | Ionic Strength (X4) | Protein Gum-Ratio (X5) | Yield %* (y) |
|---|---|---|---|---|---|---|
| 3 | 4.0 | 60 | 1.9 | 85 | 0.15 | 0 |
| 4 | 4.0 | 60 | 1.9 | 85 | 0.05 | 0 |
| 5 | 4.5 | 77.5 | 2.8 | 45 | 0.10 | 0 |
| 6 | 4.5 | 42.5 | 1.0 | 125 | 0.20 | 9.3 |
| 7 | 3.5 | 42.5 | 2.8 | 45 | 0.20 | 50.9 |
| 8 | 3.5 | 77.5 | 2.8 | 45 | 0.20 | 0 |
| 9 | 4.0 | 60 | 1.9 | 85 | 0.15 | 0 |
| 10 | 4.0 | 60 | 1.9 | 165 | 0.15 | 0 |
| 11 | 3.5 | 42.5 | 2.8 | 125 | 0.20 | 0 |
| 12 | 3.5 | 77.5 | 1.0 | 125 | 0.20 | 0 |
| 13 | 4.0 | 25 | 1.9 | 85 | 0.15 | 0 |
| 14 | 3.5 | 77.5 | 1.0 | 45 | 0.10 | 0 |
| 15 | 3.5 | 42.5 | 1.0 | 45 | 0.20 | 21.3 |
| 16 | 4.0 | 60 | 1.9 | 85 | 0.15 | 0 |
| 17 | 3.0 | 60 | 1.9 | 85 | 0.15 | 0 |
| 18 | 4.0 | 95 | 1.9 | 85 | 0.15 | 0 |
| 19 | 4.5 | 77.5 | 1.0 | 45 | 0.20 | 15.3 |
| 20 | 3.5 | 42.5 | 1.0 | 125 | 0.10 | 0 |
| 21 | 4.5 | 77.5 | 1.0 | 125 | 0.10 | 0 |
| 22 | 4.5 | 77.5 | 2.8 | 125 | 0.20 | 0 |
| 23 | 4.0 | 60 | 1.9 | 85 | 0.25 | 0 |
| 24 | 4.0 | 60 | 3.7 | 85 | 0.15 | 0 |
| 25 | 3.5 | 77.5 | 2.8 | 125 | 0.10 | 0 |
| 26 | 4.0 | 60 | 0.1 | 85 | 0.15 | 0 |
| 27 | 4.5 | 42.5 | 1.0 | 45 | 0.10 | 31.8 |
| 28 | 5.0 | 60 | 1.9 | 85 | 0.15 | 0 |
| 29 | 4.0 | 60 | 1.9 | 5 | 0.15 | 73.0 |
| 30 | 4.0 | 60 | 1.9 | 85 | 0.15 | 0 |
| 31 | 4.5 | 42.5 | 2.8 | 45 | 0.20 | 0 |
| 32 | 4.0 | 60 | 1.9 | 85 | 0.15 | 0 |

*The percent yield is calculated by dividing the weight of the lypholized fibers with the sum of the powdered soy isolate and xanthan gum.

TABLE 1A

| Run | X1 | X2 | X3 | X4 | X5 | Yield |
|---|---|---|---|---|---|---|
| 1 | 0 | 0 | 0 | 0 | 0 | 0.0 |
| 2 | 1 | −1 | 1 | 1 | −1 | 0.0 |
| 3 | 0 | 0 | 0 | 0 | 0 | 0.0 |
| 4 | 0 | 0 | 0 | 0 | −2 | 0.0 |
| 5 | 1 | 1 | 1 | −1 | −1 | 0.0 |
| 6 | 1 | −1 | −1 | 1 | 1 | 9.3 |
| 7 | −1 | −1 | −1 | 1 | 1 | 50.9 |
| 8 | −1 | 1 | 1 | −1 | 1 | 0.0 |
| 9 | 0 | 0 | 0 | 0 | 0 | 0.0 |
| 10 | 0 | 0 | 0 | 2 | 0 | 0.0 |
| 11 | −1 | −1 | 1 | 1 | 1 | 0.0 |
| 12 | −1 | 1 | −1 | 1 | 1 | 0.0 |
| 13 | 0 | −2 | 0 | 0 | 0 | 0.0 |
| 14 | −1 | 1 | −1 | −1 | −1 | 0.0 |
| 15 | −1 | −1 | −1 | −1 | 1 | 21.3 |
| 16 | 0 | 0 | 0 | 0 | 0 | 0.0 |
| 17 | −2 | 0 | 0 | 0 | 0 | 0.0 |
| 18 | 0 | 2 | 0 | 0 | 0 | 0.0 |
| 19 | 1 | 1 | −1 | −1 | 1 | 15.3 |
| 20 | −1 | −1 | −1 | 1 | −1 | 0.0 |
| 21 | 1 | 1 | −1 | 1 | −1 | 0.0 |
| 22 | 1 | 1 | 1 | 1 | 1 | 0.0 |
| 23 | 0 | 0 | 0 | 0 | 2 | 0.0 |
| 24 | 0 | 0 | 2 | 0 | 0 | 0.0 |
| 25 | −1 | 1 | 1 | 1 | −1 | 0.0 |
| 26 | 0 | 0 | −2 | 0 | 0 | 0.0 |
| 27 | 1 | −1 | −1 | −1 | −1 | 31.8 |
| 28 | 2 | 0 | 0 | 0 | 0 | 0.0 |
| 29 | 0 | 0 | 0 | −2 | 01 | 73.0 |
| 30 | 0 | 0 | 0 | 0 | 0 | 0.0 |
| 31 | 1 | −1 | 1 | −1 | 1 | 0.0 |
| 32 | 0 | 0 | 0 | 0 | 0 | 0.0 |

0's are the center points. 1, 2 and −1, −2 are the upper and the lower levels of the variables, X1, X2, X3, X4 and X5, respectively.

These results show that the optimal conditional design is away from the center point of the design in the negative direction on ionic strength and probably on temperature, pH and gum/protein ratio as well. Coefficients in the quadratic equation were estimated using yield values for all 32 runs. The equation utilized is:

Yield = $-4X_2 - 11X_4 + 9X_4^2 + 5X_2X_4 + 4X_2X_5 - 3X_4X_5 - 5X_1X_3 - 4X_3X_5 +$ Constant with Xi's in coded form, $-2 \leq Xi \leq 2$. Hence, increased yields would be expected by moving all variables away from zero, X3 (% T.S.) in the positive direction and the other four variables in the negative direction.

Accordingly, a second statistical experiment was carried out utilizing $2^3$ factorial design, using values of pH, temperature and ionic strength below the center of the first experiment represented by Tables 1 and 1A, but fixing the percent total solids and gum/protein ratio at 2% and 1:6, respectively. Response variables are fiber yield (%) and fiber quality (firm/soft) with high yield of firm fiber desired. The multivariable test results are shown in Table 2.

TABLE 2

| Run | pH (X1) | Temp. (°C.) (X2) | Ionic Strength (X4) | Yield % | Level of Variable* | | |
|---|---|---|---|---|---|---|---|
| | | | | | X1 | X2 | X4 |
| 1 | 5.0 | 45 | 10 | 54.0 | 1 | 1 | 1 |
| 2 | 3.0 | 45 | 0 | 78.0 | −1 | 1 | −1 |
| 3 | 5.0 | 5 | 10 | 44.6 | 1 | −1 | 1 |
| 4 | 3.0 | 5 | 10 | 42.9 | −1 | −1 | 1 |
| 5 | 5.0 | 45 | 0 | 57.4 | 1 | 1 | −1 |
| 6 | 3.0 | 5 | 0 | 56.6 | −1 | −1 | −1 |
| 7 | 4.0 | 25 | 5 | 54.9 | 0 | 0 | 0 |
| 8 | 3.0 | 45 | 10 | 47.2 | −1 | 1 | 1 |
| 9 | 4.0 | 25 | 5 | 52.3 | 0 | 0 | 0 |
| 10 | 5.0 | 5 | 0 | 60.0 | 1 | −1 | −1 |

*1 and −1 are two levels of the statistical variables, X1, X2 and X4. 0's are the center points.

The prediction equation is:
Yield = $54.8 - 1.1X_1 + 4.1X_2 - 7.9X_4 - 2.3X_1X_2 + 3.2X_1X_4 - 0.6X_2X_4$ with Xi's in coded form $-2 \leq Xi \leq 1$. The result based on the derived equation shows that yield increases as both X1 (pH) and X4 (ionic strength) move in the negative direction and as X2 (temperature) moves in the positive direction. Thus, in the data plot of FIG. 4, the optimal point with respect to yield is the lower left hand corner of the cube (pH=3, temperature=45° C., ionic strength=0 mM NaCl added). However, the fiber quality produced under such conditions is not good. At the right hand corner (pH=5.0, temperature=45° C., ionic strength=0), the fiber is firm but the yield is low.

Figure 4:
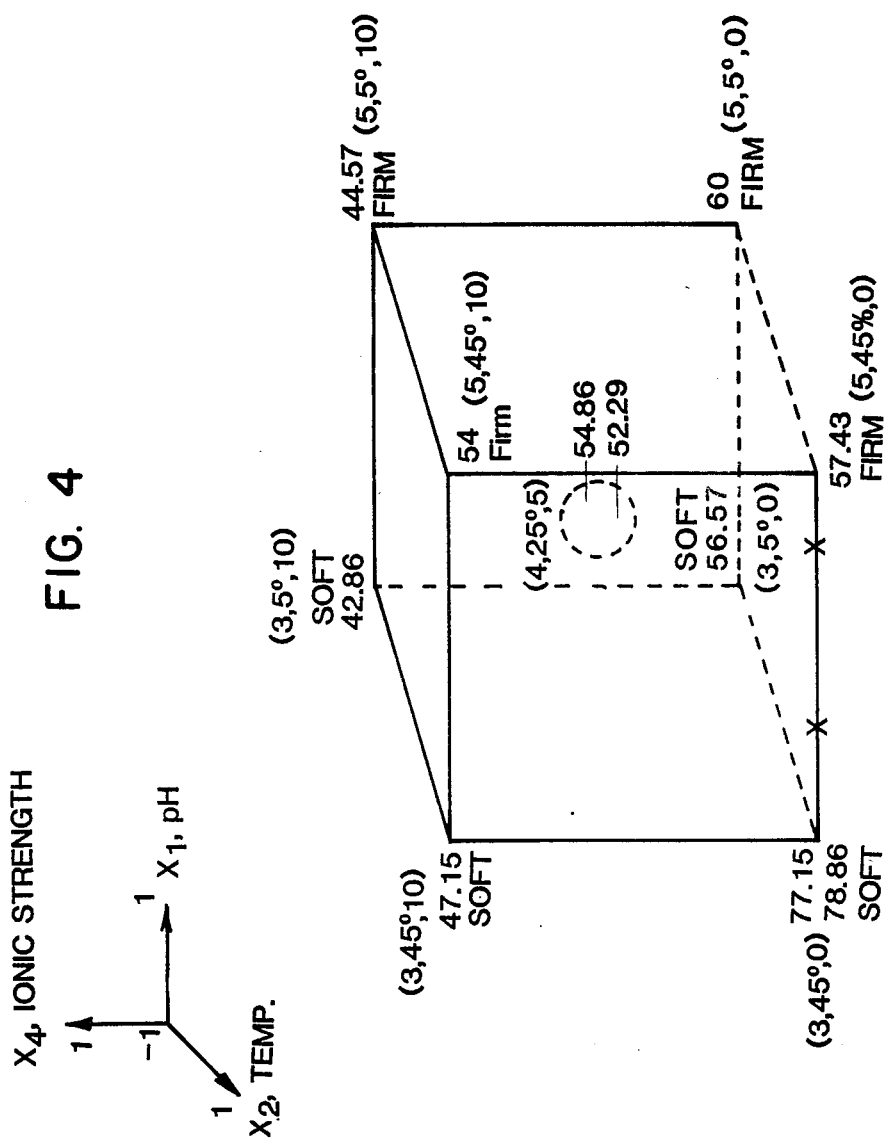
FIG. 4 is a data plot of a statistical process variable evaluation in respect to methods for preparation of soy protein isolate-xanthan gum fibers of the type illustrated in FIG. 1.

In order to determine processing conditions which provide increased yield consistent with good fiber quality, two additional runs were carried out at the points marked by X in FIG. 4 (pH 3.5 and 4.5). Firm fibers were obtained from both runs indicating that pH could be as low as 3.5.

Figure 5:
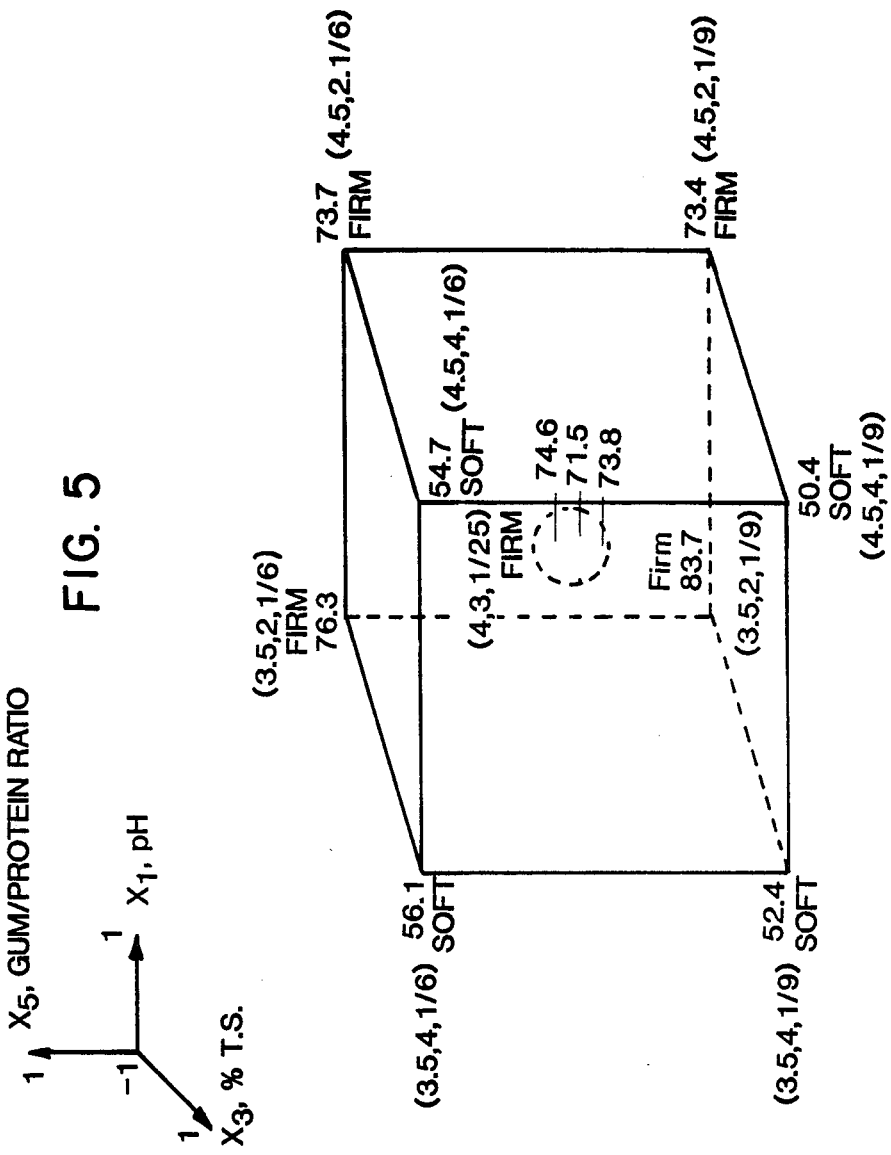
FIG. 5 is a data plot of a further statistical process variable evaluation test to that of FIG. 4 in respect to methods for preparation of soy protein isolate-xanthan gum fibers.

A third statistical experiment is carried out utilizing another $2^3$ factorial design plus three replicate runs at the center, as shown in FIG. 5 Experimental variables and their levels were:

| Variable | Level | | |
|---|---|---|---|
| | −1 | 0 | 1 |
| X1 = pH | 3.5 | 4.0 | 4.5 |
| X3 = % Total solids | 2.0 | 3.0 | 4.0 |
| X5 = gum/protein ratio | 1.9 | 1/7.5 | 1/6 |
| X2 = Temperature, °C. | fixed at 45° C. | | |
| X4 = Ionic strength, mM NaCl | fixed at 0 | | |

Response variables were fiber yield (%) and fiber quality (soft/firm). Data are listed in Table 3, as follows:

TABLE 3

| Run | pH (X1) | % T.S. (X3) | Protein Gum/ Ratio (X5) | Yield % | Quality | Level of Variable* | | |
|---|---|---|---|---|---|---|---|---|
| | | | | | | X1 | X3 | X5 |
| 1 | 4.5 | 2 | 6.0 | 73.7 | firm | 1 | −1 | 1 |
| 2 | 4.0 | 3 | 7.5 | 74.6 | firm | 0 | 0 | 0 |
| 3 | 3.5 | 2 | 6.0 | 76.3 | firm | −1 | −1 | 1 |
| 4 | 4.5 | 2 | 9.0 | 73.4 | firm | 1 | −1 | −1 |
| 5 | 4.0 | 3 | 7.5 | 71.5 | firm | 0 | 0 | 0 |
| 6 | 3.5 | 4 | 9.0 | 52.4 | soft | −1 | 1 | −1 |
| 7 | 3.5 | 2 | 9.0 | 83.7 | firm | −1 | −1 | −1 |
| 8 | 3.5 | 4 | 6.0 | 56.1 | soft | −1 | 1 | 1 |
| 9 | 4.0 | 3 | 7.5 | 73.8 | firm | 0 | 0 | 0 |
| 10 | 4.5 | 4 | 6.0 | 54.7 | soft | 1 | 1 | 1 |
| 11 | 4.5 | 4 | 9.0 | 50.4 | soft | 1 | 1 | −1 |

*1 and −1 are the two levels of the statistical variables, X1, X2, and X4. 0's are the center points.

The prediction equation is:
Yield = $67.3 - 2.0X_1 - 11.7X_3 + 0.1X_5 + 1.2X_1X_3 + 1.0X_1X_5 + 1.9X_3X_5$ with Xi's in coded form, $-1 \leq X1 \leq 1$. The equation shows that moving X3 (percent total solids) in the negative direction would increase the percent yield and also achieve good fiber quality. From the data plotted in FIG. 5, it may be observed that a higher protein/gum ratio may be an advantage with respect to nutrition and cost provided that other functionalities such as flavor and tenderness are acceptable, and it is desirable for the pH value to be relatively high for flavor considerations. Thus, an optimal region may be around pH 4.5, temperature=45° C., total solids=2%, ionic strength=0 mM NaCl added and gum/protein ratio=1:9.

The highest yield obtained from these three statistical experiments was 83.7%. This represents a 91% efficiency for the reactions, based on the weight percent of the protein present. Since the mode of mixing, stirring and order of addition are also critical factors for generating fibers, an optimization of these factors could result in an increase of yield and quality of fibers. For example, by altering the order of addition, an 86.6 fiber yield has been obtained which means that the reaction went to 96% completion. The theoretical maximum yield from the raw materials used is 90%.

Figure 6:
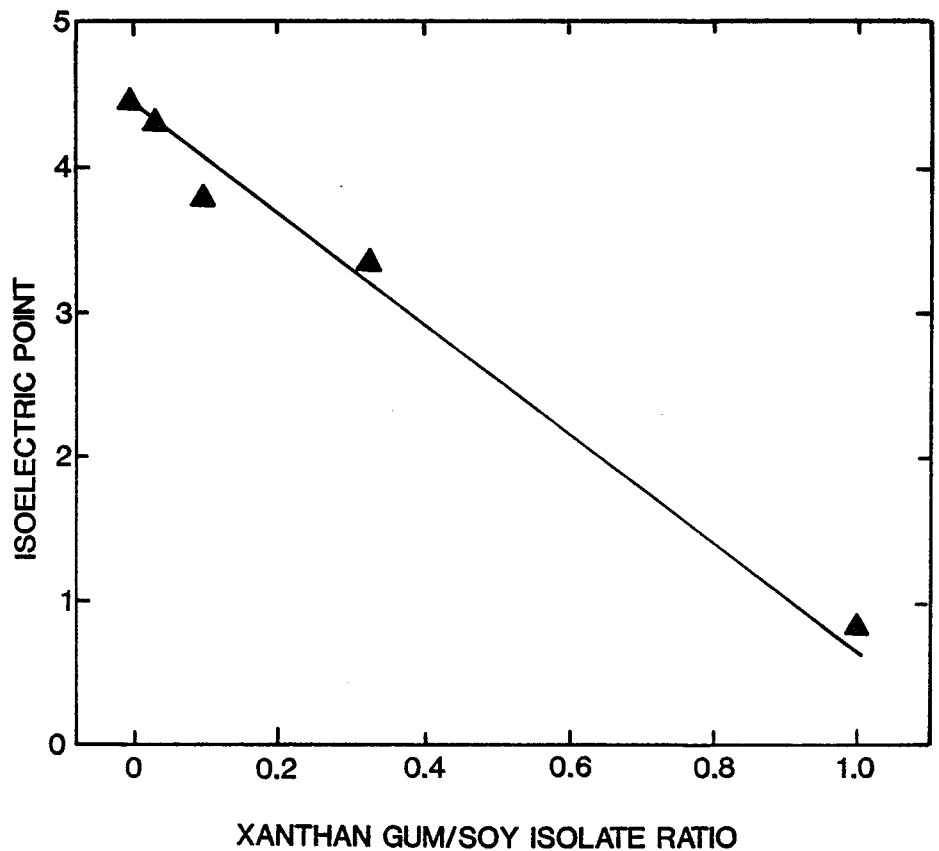
FIG. 6 is a plot of soy protein isolate-xanthan gum complex isoelectric points versus gum/protein ratio of the complex.

The quantity of xanthan gum which is present in the fiber whey may be estimated by plotting the isoelectric point of the whey versus xanthan gum/soy protein ratio as shown in FIG. 6. Since the total volume of the fiber whey is known and the protein content can be determined by Lowry's protein quantitation method, SDS (sodium dodecyl sulfate) gel electrophoresis or Kjeldahl nitrogen analysis, the amount of xanthan gum in the fiber whey can be determined. For a xanthan gum/soy isolate weight ratio of 0.13 (e.g., a ratio of one part xanthan gum to about 7.5 parts soy isolate) in the fiber generating solution, the isoelectric point of the fiber whey was substantially the same as the soy isolate alone, indicating that all the gum is used up in forming the fibrous complex. For a 1:1 xanthan gum/soy isolate weight ratio mixture, the isoelectric point of the fiber whey is substantially the same as that of the xanthan gum alone, suggesting that all the protein is used up to form the complex, leaving an excess of xanthan gum in the fiber whey.

The mode of stirring is an important factor for generating various shapes and sizes of fibers upon acidification of the slurry mixture of xanthan gums and proteins. Long and stringy fibers may be obtained when the gum/protein mixture was stirred by using a stirring rod or other spinning devices upon acidification. These resemble the fibers of poultry, beef or pork. Fine and short fibers were obtained in a Waring blender with stirring at the slowest speed but fast enough to agitate the slurry into motion, carried out for only a few seconds. Prolonged stirring under high shear produces fibers which are too fine and too short for meat simulating textures, apparently because it allows the blades of the blender to chop the fibers into small pieces. Evidently, the speed and the time of stirring control the shape and size of the fiber.

Because all the charged gums modify the isoelectric points of proteins, the above technique can be used to estimate the gum content in the complex whey for other gums that are used to form complexes with the proteins.

As indicated, fibers of xanthan gum-soy isolate complex may soften when flavored with flavoring agents such as conventional meat base flavoring agents. Since the fiber formation of xanthan gum and the protein is mainly governed by electrostatic attraction force, the pH and ionic strength in the flavoring agents may cause such softening, and in this regard, flavoring agents tend to contain large amounts of salts or have a pH which is adverse to the integrity of the fibers.

Because the complexes of xanthan gum and the proteins as initially formed in aqueous solution are believed to be primarily mainly electrostatic and therefore sensitive to pH and ionic strength, methods for stabilizing the bond between the two bipolymers, so that the complex was stable under various processing conditions utilized in manufacture or storage of various food products are important for the development and commercial utilization of the synthetic fibers. Fibers prepared in accordance with the present disclosure such as of xanthan gum-soy protein isolate complexes and soy protein isolate-egg albumin-xanthan ternary complexes may be produced which are relatively bland, firm, white and chewy. These edible fiber compositions may be flavored to prepare meat simulating compositions such as simulated chicken, pork, crab and lobster meat, which in turn may be utilized to prepare food dishes utilizing the respective meats, such as crab and lobster salads. However, such fibers may tend to become soft and mushy or even lose their fibrous structure when they were flavored with various flavoring agents, particularly including commercial flavoring agent that contains salt. In accordance with the present disclosure, methods are provided for stabilizing the fiber complex so as to prevent the fibers from softening under various processing conditions.

Further in accordance with the disclosure, the shape, size and firmness of the fibers may be controlled to mimic the texture of fish, shellfish, poultry and other meat fibers, and methods are provided for flavoring the fibers of the protein-xanthan gum complex so as to obtain products.

In this regard, data illustrating the effects of sodium hydroxide and sodium phosphate at various levels are listed in the following Tables 4 and 5.

TABLE 4

Effect of Added Sodium Hydroxide on the Texture of Xanthan Gum-Soy Isolate (1:6) Fibers*

| mM NaOH | 1 min Incubation | | 15 Hr Incubation, 5° C. | |
|---|---|---|---|---|
| | pH | Texture of Fibers | pH | Texture of Fibers |
| 0 | 4.0 | firm | 3.8 | firm |
| 5 | 5.1 | firm | 4.4 | firm |
| 10 | 6.1 | soft | 4.9 | soft |
| 33 | 7.0 | softer | 5.5 | softer |

*50 g. drain-dried fibers were suspended in 50 ml. of NaOH solution and their firmness was determined tactily.

TABLE 5

Effect of Added Sodium Phosphate on the Texture of Xanthan Gum-Soy Isolate (1:6) Fibers*

| | 2.5 Hour Incubation | |
|---|---|---|
| mM NaH$_2$PO$_4$ | pH | Texture of Fibers |
| 0 | 4.0 | firm |
| 10 | 4.1 | firm |
| 33 | 4.4 | firm |
| 100** | 4.8 | soft |
| 1000** | 5.6 | softer |

*50 g. drain dried fibers were suspended in 50 ml of NaH$_2$PO$_4$ solution, and the firmness of the fibers was determined subjectively.
**The fibers were not only soft but also gummy and slimy, indicating that the gum was dissolved and adsorbed on the surface of the fiber.

Sodium chloride solution also softens the fibers at concentrations above 0.1M as shown in the following Table 6.

TABLE 6

Effect of Sodium Chloride Solution on the Texture of Xanthan Gum-Soy Isolate (1:6) Fibers*

| mM NaCl | Texture of Fibers |
|---|---|
| 0 | firm |
| 100** | firmer |
| 1000*** | soft |

*50 g. drain-dried fibers were suspended in 50 ml. of the NaCl solution, and the firmness of the fibers was determined subjectively
**The fibers were firmer in the presence of 100 mM than 0 mM NaCl solution presumably because the ionic strength enhances the syneresis of the fibers
***High salt appears to disrupt ionic bonding between the gum and the protein so as to weaken the complex formation The boiled fibers remained firm while the non-heat treated ones became soft, gummy and slimy on the surfaces of the fibers in the presence of 0.5M NaH$_2$PO$_4$. The pH of the fiber suspension was 5.6. Although the present invention is not bound or limited thereby, it is theorized that the heat treatment denatures either the protein or the gum/protein complex as a whole in such a way that these two biopolymers become physically entangled. As a result, the complex is more stable and has more resistance to dissociation by pH and ionic strength.

Figure 7:
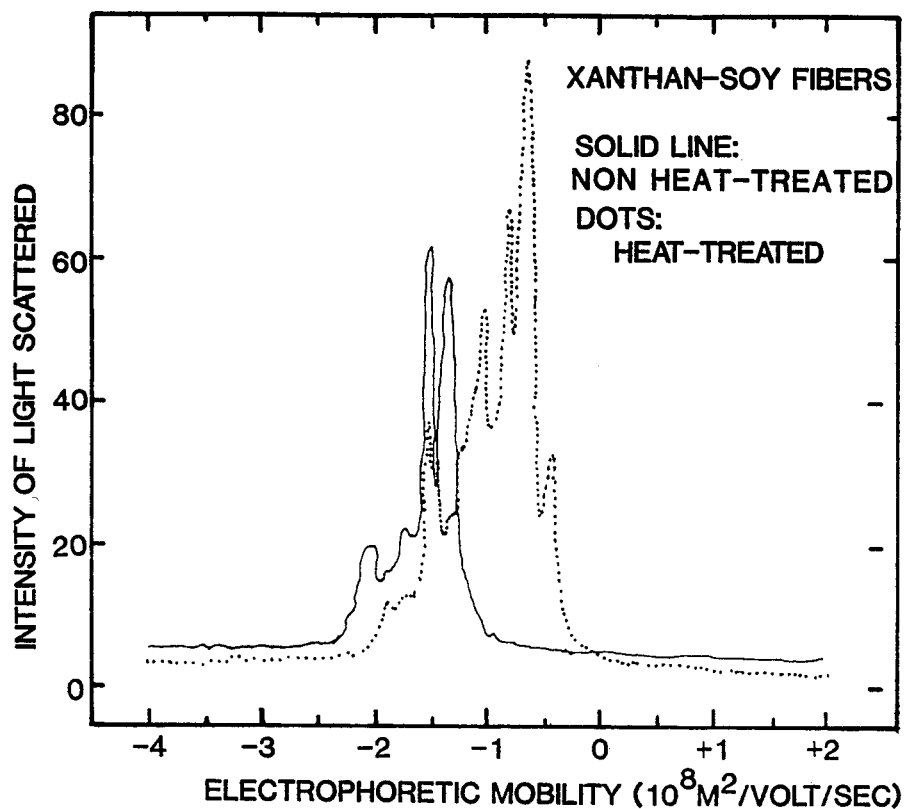
FIG. 7 is an electrophoretic mobility histogram of heat treated and non-heat treated soy protein isolate fibers in sodium phosphate solution.

Under harsh conditions, the fibers of xanthan gum-soy protein complex may become "slimy" and lose their integrity, which appears to result from the dissociation of free xanthan gum molecules from the fibrous complex, dissolved in the buffer solution and then readsorbed onto the surface of the fibers. If this assumption is correct, then the electrophoretic mobility (which corresponds to the surface-charge) of the unboiled fibers should be more negatively charged than the boiled ones when at identical pH. FIG. 7 shows that the mean electrophoretic mobility of the unboiled fibers was twice as negative as that of the boiled ones. Because the gum was more negatively charged than the protein, the fiber with higher gum/protein ratio should have been more negatively charged than the fiber with lower gum/protein ratio. Since electrokinetic analysis showed that the boiled fibers, which had higher gum/protein ratio based on the carbohydrate/protein ratios shown in Table 7, had lower electrophoretic mobility and firmer texture than the unboiled fibers, the cause for the difference of the surface charge is apparently not due to the gum/protein ratio but rather is apparently due to the changes of configuration and orientation of the gum and the protein in the fiber system resulting from the heat treatment. Even though the gum concentration in the boiled fibers was greater than in the unboiled fibers, less gum was on the surface of the boiled fibers compared to the unboiled fibers.

Heat treatment of the protein-gum complex fibers not only results in stabilization of the fibers to retain their firmness, but may also be utilized to pasteurize the fibers. Heat treatment of the fibers, as by boiling, reduced the total bacterial counts from $5 \times 10^3$ to less than 10, showing the pasteurizing effect of the heat treatment. Microwaving also decreased the total bacterial counts indicating that microwaving was bacteriocidal. The bacterial counts of the unboiled fibers and their derivatized food products are very low and boiling makes the fibers and their products nearly sterile. In addition, by varying the temperature and the time of heating, different degrees of firmness and stability of the fibers can be obtained, as desired.

The compositions of heat treated xanthan-soy protein isolate fibers and fibers which have not been heat treated are set forth in the following Table 7:

TABLE 7

Compositions of Boiled and Unboiled Xanthan Gum-Soy Isolate (1:6) Fibers in Drain-Dried and Freeze-Dried Forms*

| Percent | Drain-Dried Fibers | | Freeze Dried Fibers | |
|---|---|---|---|---|
| | Unboiled | Boiled | Unboiled | Boiled |
| Moisture | 82.88 | 81.58 | 3.71 | 3.42 |
| Fat | 0.5 | 0.67 | 3.06 | 3.03 |
| Nitrogen | 2.3 | 2.4 | 12.93 | 12.32 |
| Protein | 14.38 | 15.0 | 80.81 | 77.0 |
| Ash | 0.05 | 0.05 | 0.78 | 0.76 |
| Fiber | 0.13 | 0.08 | 0.03 | 0.14 |
| Carbohydrate | 2.06 | 2.62 | 11.61 | 15.65 |

*The fibers were prepared from the mixture of a 1:6 xanthan gum/soy isolate ratio. Half of the fibers were boiled in water for 5 min. Both boiled and unboiled fibers were washed and drain-dried. Some of the boiled and unboiled fibers were freeze-dried and ground into powder before they were submitted for composition studies.

Upon blending with 1% (w/w) fine salt (crystalline sodium chloride), the unboiled fibers of the xanthan gum-soy isolate (1:6) complex softened while the corresponding boiled fibers remained firm as illustrated in the following Table 8:

TABLE 8

Effect of Fine Salt (Crystalline Sodium Chloride) on the Texture of Xanthan Gum-Soy Isolate (1:6) Fibers*

| Fine Salt % (W/W)** | Texture of Unboiled Fibers | Texture of Boiled Fibers |
|---|---|---|
| 0 | firm | firm |
| 0.5 | firm | firm |
| 1.0 | soft | firm |
| 4.0 | softer | — |
| 5.0 | softest | soft |

*Fine salt was sprinkled on and blended in the drain-dried fibers. The firmness of the fibers was then determined subjectively.
**On the weight basis of drain-dried fibers.

These results further demonstrate that heat treatment in accordance with the present disclosure stabilizes the protein-gum complex fibers and so prevents the fibers from softening against ionic strength.

Tables 6 and 8 also show that crystalline sodium chloride, such as is typically present in flavoring materials, softened the fibers more readily than did the sodium chloride solution. This was apparently due to a localization effect of salt in the fiber system. In other words, the salt concentration on the fiber's surface was very high before the salt was evenly dispersed in the entire fiber system.

As indicated by the data of Table 9, sucrose does not appear to significantly soften the xanthan gum-soy protein fibers. This indicates that sugar can be used to sweeten the gum/protein complex as needed without a risk of softening the fibers.

TABLE 9

Effect of Sugar on the Texture of Xanthan Gum-Soy Isolate (1:6) Fibers

| Sucrose % (W/W)* | Texture** | Sweetness** |
|---|---|---|
| 0 | firm | bland |
| 1 | firm | slightly sweet |
| 5 | firm | very sweet |

*Powdered sugar was sprinkled on and then blended in the drain-dried fibers. The percentage was on the weight basis of drain-dried fibers.
**The firmness and sweetness of the fibers was determined subjectively.

Citric acid, which is widely used as a preservative in food products, also has a tendency to soften the fibers, possibly because it disrupts the ionic bonds that link xanthan gum and soy protein. Data in respect to the softening effect of citric acid on the 1:6 xanthan gum/soy isolate fibers are shown in the following Table 10:

TABLE 10

Effect of Citric Acid on the Texture of Xanthan Gum-Soy Isolate (1:6) Fibers

| mM Citric Acid* | pH | Texture of Fibers** |
|---|---|---|
| 0 | 3.85 | firm |
| 10 | 3.4 | soft |
| 100 | — | softer |
| 1000 | 3.4 | dissolved |

*50 g. drain-dried fibers were suspended in 50 ml of various concentration of citric acid solutions.
**The firmness of the fibers was determined subjectively. 1% (w/w) and above crystalline citric acid was also found to soften the fibers when it was sprinkled on and blended into the fibers.

Surprisingly, however, citric acid can be used to acidify the xanthan gum/protein mixture with stirring to generate firm fibers. Apparently citric acid in the latter case served as a proton donor to bring the two biopolymers together to form the gum-protein complex. Accordingly, if it is desired to utilize citric acid as a preservative, it may be used to acidify the gum/protein mixture to generate fibers because the citrate ions could be entrapped and retained in the fiber network to serve as a preservative. Moreover, heat treatment in accordance with the present invention has been found to minimize the softening effect of the citric acid in the fibers.

In order to quantify the firmness of the fibers, a method was developed to measure the force required to drive a series of blades, in a standard Kramer multi-bladed shear cell having 10 blades each 3 millimeters thick and 7 millimeters wide, on an Instron Universal Testing Machine available from Instron Corp. of Canton, Ohio, through $5 \times 5$ cm slabs of the pressed fibers.

This force corresponds to the firmness of the fibers. An example is shown in Table 11:

TABLE 11

Mechanical Testing of Boiled and Unboiled Fibers of Xanthan Gum-Soy Isolate (1:6) Complex*

| Sample | Peak Force (Kg)** | Texture |
|---|---|---|
| Unboiled fibers, pressed | 186 ± 25 | firm |
| boiled fibers, pressed | 424 ± 43 | much firmer |

*The fibers of unboiled and boiled (5 min. boiling treatment xanthan gum-soy isolate (1:6) complex were pressed (50 psi, 25° C., 2 hr) into 1" × 8" × 8" blocks which were then cut into 5 × 5 cm slabs.
**The force required to drive a series of blades in a standard testing cell through the slabs. Note that the firmer material requires more force than the softer material The data in Table 11 shows that the force required for the Instron's blades to cut through the boiled and pressed fibers of the soy isolate protein-xanthan gum complex is approximately twice as much as to cut through the corresponding unboiled and pressed fibers. This indicates that the heat treatment may significantly increase (e.g., double) the firmness of the fibers. It is preferred that fibers prepared in accordance with the present invention have a firmness of at least about 100 1 kg at a water content of at least about 50 weight percent of the fiber.

The moisture content of the drain-dried fibers will generally be in the range of 75 to about 90 percent, such as about 80%, and it is desirable to add flavoring agents when the fibers contain this amount of moisture. However, the fibers, as precipitated, or after heat stabilization may be substantially reduced in moisture content to provide a low moisture fiber product which retains its fiber integrity. When the fibers were lypholized to the state that their moisture content was only about 24%, the fibers remained firm and strong although they felt dry. These fibers (with 24% moisture content) could be rehydrated to obtain a texture that is similar to that of the drain-dried ones.

The moisture content of pressed fibers will generally be in the range of from 60 to about 75 percent, such as about 65%. Fiber compositions having reduced moisture content may be provided which have longer shelf life and easier handling for shipping and storage. However, the fibers may become fragile and brittle at very low moisture content, for example, as when they were lypholized to contain only 3.7% moisture. As a result, a suitable amount of moisture content is needed in order to maintain their firmness and keep their structural integrity. The composition of the protein-xanthan gum fibers at different stages of dryng are shown in the following Table 12:

TABLE 12

Moisture Content of Protein-Xanthan Gum Fibers at Different Drying Stages

| Percent | Drain Dried | Intermediate Lyophilization* | Extensive Lyophilization |
|---|---|---|---|
| Moisture | 82.88 | 24.04 | 3.71 |
| Fat | 0.5 | 1.97 | 3.06 |
| Nitrogen | 2.3 | 9.85 | 12.93 |
| Protein | 14.38 | 61.56 | 80.81 |
| Ash | 0.05 | 0.76 | 0.78 |
| Fiber | 0.13 | 0.2 | 0.03 |
| Carbohydrate | 2.06 | 11.47 | 11.61 |

*The fibers with 24.04% moisture contented remained firm and strong although they felt dry.

In accordance with the present disclosure, the whiteness of the fibers of protein-xanthan gum complexes is an important functionality for preparing protein-xanthan gum-based food products. To simulate the whiteness of certain meats including poultry, fish and shellfish, the whiteness of the protein-gum fibers should be monitored and optimized. Color data in respect to measurement of fiber whiteness are shown in the following Table 13:

TABLE 13

Whiteness Measurement for Boiled and Press-Dried Fibers of Xanthan Gum-Protein Complexes*

| Boiled and Press-Dried Fibers | L Lightness | A Red | B Yellow |
|---|---|---|---|
| Xanthan gum-soy isolate (1:6) complex | 74.56 | 2.73 | 12.55 |
| Xanthan gum-soy isolate-egg albumin (1:3:3) complex | 82.14 | 1.92 | 12.22 |
| Xanthan gum-egg albumin (1:6) complex | 91.85 | 0.48 | 10.06 |

*The color values were determined on a Gardner XL805 color difference meter. The lightness corresponds to the whiteness The Garner XL805 color difference values show that lightness of the soy isolate-xanthan gum fibers can be enhanced by incorporating egg albumin into the system to form the soy isolate-xanthan gum-egg albumin ternary complex. This is evidenced according to the increasing order of the whiteness of the fibers of these complexes: Xanthan gum-soy isolate (1:6) complex<Xanthan gum-soy isolate-egg albumin (1:3:3) ternary complex<Xanthan gum-egg albumin (1:6) complex.

As indicated, the xanthan-protein fiber compositions in accordance with the present invention may be flavored to simulate the flavor of a selected natural meat composition, particularly after heat stabilization of the fiber complex. For example, the fibers of protein-xanthan gum complex by: (a) sprinkling 2% (w/w) flavoring agent onto drain-dried fibers and blending them in a Hobart blender for 30 seconds or until the flavoring agent was evenly dispersed in the fiber system, (b) sprinkling dried egg white, which is used as a binder, onto the flavored fibers and then blending the mixture in the same Hobart blender for 30 seconds, (c) adding 5% (w/w/) Henningsen's chicken fat or 5% (w/w) Armour lard to (b) and blending the mixture for 30 seconds to obtain chicken or pork analogs, respectively, (d) allowing the flavored fibers from step (c) to stand at 25° C. for 30 minutes, (e) pressing the flavored and 30-minute incubated fibers on a cheese press under 50 psi at 25° C. for 1 hour.

The time of incubation, the time and pressure of pressing can be varied depending upon the firmness and water-holding activity of the fibers and upon the moisture content desired in the finished products. As previously discussed, drain-dried fibers may normally hold a substantial amount of water (e.g., about 80 percent by weight) which may function to dissolve the flavoring agents and which may also function to hydrate a binding agent such as dried egg whites so that the fibers can bind together upon pressing and/or heating-setting. Nevertheless, some of the flavoring agents and/or the binder may be squeezed out of the fibers upon pressing. In order to minimize the loss of the flavoring agent and the binder, the fibers may desirably be dehydrated, to a certain extent, by centrifugation before flavoring. The amount of water expelled from the fibers may be regulated by varying the speed and time of centrifugation.

The fibers of protein-xanthan gum complex may also be flavored by blending melted processed cheese with the fibrous complex. This provides a product having a meat-like, chewy texture with a cheese flavor. Another type of product can be prepared by mixing cubes or slices of cheese with meat-flavored fibers to obtain a cheeseburger-type of pattie.

The flavored and pressed patties may be heat-set by raising the temperature of the blended fiber and binder mixture or mean boiling temperatures of water. Such heating may be accomplished by means of conventional hot air, radiation, conduction or microwave ovens. For example, a pattie may be heat set by cooking in a 700 watt microwave oven for 1 minute for every 200 grams of pattie. The heating temperature and time can be varied depending on the physicochemical properties of the fibers as well as the desired texture and appearance of the pattie.

Heat-setting is not required for all applications of pressed fibers. For example, press patties may be breaded and deep fried directly without the heat-setting step.

The fibers of soy protein-xanthan gum (e.g., 6:1) complex prepared from the soy isolate and Xanthan gum in accordance with the present disclosure may be provided which are relatively bland. However, a slight sourness may be noted in certain formulations such as a chicken pattie formulation under certain conditions. Variation of amounts of acid (1 molar hydrochloride acid) used for acidifying the soy protein-xanthan gum mixture to generate fibers is shown in the following Table 14:

TABLE 14
Relationship Between Sourness and Acidity of Fibrous Protein-Xanthan Gum Complex

| Sample | Fiber | Fiber Whey (Supernatant) | Protein-Xanthan Gum Based Chicken Pattie pH | Sourness |
|---|---|---|---|---|
| Xanthan Gum-Soy Isolate (1:6) Complex* | 4.25 | 4.0 | 4.75 | Slightly Sour |
| Xanthan Gum-Soy Isolate (1:6) Complex* | — | 4.95 | 4.73 | Slightly Sour |
| Xanthan Gum-Soy Isolate (1:6) Complex* | — | 5.35 | 4.8 | Slightly Sour |
| Xanthan Gum-Egg Albumin (1:6) Complex | 5.35 | 3.9 | 5.3 | Not Sour |
| Xanthan Gum-Soy-Egg Albumin (1:3:3) Ternary Complex | — | 3.9 | 5.15 | Not Sour |
| 1:1 Blend of Xanthan Soy (1:6) & Xanthan Egg Albumin (1:6) Complexes | — | — | 5.0 | Slightly Sour |

*The fibers of xanthan gum-soy isolate (1:6) complex prepared by varying the amount of acid to acidify the gum/protein mixture so that the pH's of the supernatants resulted from these fiber formations are different. Higher pH's of the supernatants were obtained when less amounts of the acid were used. However, the pH's in the chicken patties remained the same.

The pH values of the fibers prepared by using different amounts of acid to adjust the fiber generating solution to a fiber precipitation pH were essentially the same, indicating that the pH value of the fiber was determined by the net charges of the complex which is composed of soy protein and xanthan gum. Apparently, the net charge of the fiber prepared from the egg albumin and xanthan gum was slightly different from that of the soy-xanthan complex. Therefore, the fibers of xanthan-egg albumin complex or xanthan-soy-egg albumin ternary complex had higher pH values and did not taste sour. This explained why egg albumin improved the blandness of the fibers when it was incorporated into the fiber system to form the xanthan-soy-egg albumin ternary complex.

Having described various specific aspects of utilization of xanthan gum-protein fiber compositions in meat simulating formulation, the following specific examples and recipes will further demonstrate the utility of various specific meat simulating formulations.

The fibers of protein-xanthan gum complexes were either boiled or unboiled, drain-dried and then flavored with 2-5% (w/w) Haarmann and Reimer's (H and R's) "Taste of Crab", L. J. Minor's Lobster base, H and R's "Taste of Shrimp", H and R's "Taste of Scallop", H and R's "Taste of Chicken", L. J. Minor's "Beef Base" and H and R's "Taste of Pork" to obtain protein-xanthan gum-based crab, lobster, shrimp, scallop, chicken, beef and pork, respectively. These flavored protein-xanthan gum fibers were either used as they were or pressed to form patties with or without heat-setting depending on the applications. Some of them were used to prepare various dishes such as crab and lobster salads, crab and lobster croquettes, battered and breaded chicken patties, Italian boneless chicken, hot chicken salad, cashew chicken nuggets and Moo Goo Gai Pan (a Chinese dish that is prepared by stir-frying the protein-xanthan based chicken analog with Chinese vegetables). These gum-protein complexes may be used to prepare either 100% or partial replacement meat, poultry or seafood products. The formulas and procedures for preparing these food products are described as follows and were based on recipes taken from various published cookbooks and articles:

Extended Crabmeat Salad of Soy Protein-Xanthan Gum Fibers

| Formula | Grams | Percent |
|---|---|---|
| Crab-flavored xanthan-soy (1:6) fibers* | 410 | 59.4 |
| Mayonnaise | 107.16 | 25.52 |
| Minced celery, fresh | 83.4 | 12.08 |
| Minced onion, fresh | 39.7 | 5.75 |
| Minced dill pickles | 39.7 | 5.75 |
| Lemon juice, single strength (Borden) | 9.53 | 1.38 |
| White pepper, ground | 0.83 | 0.12 |
| | 690.32 | 100% |

*The fibers were flavored with 2% (w/w) H & R's "Taste of Crab"(R6388). For 50% replacement crab analog, a combination of 205 g. cooked King crabmeat and 205 g. unflavored xanthan gum-soy protein (1:6) fibers was used.

Procedure (a) Blend celery, onion pepper and pickles, by hand in a bowl.

(b) Add blend from (a) to the crab flavored xanthan gum-soy isolate (1:6) fibers in a separate bowl. Add mayonnaise and lemon juice. Mix by hand until uniform (one minute). Salad is ready to serve.

(c) For the 50% replacement crabmeat salad, the unflavored xanthan soy fibers and the King crabmeat were first minced thoroughly in a Hobart mixer at slow speed for approximately one minute before the spices were added.

An extended lobster meat salad of soy protein-xanthan gum fibers may be prepared by the same formula and procedure as for the crabmeat salad, except that the fibers are flavored with 2% (w/w) L. J. Minor's lobster base.

Soy Protein-Xanthan Gum-Based Crabmeat Croquettes

| Formula | Grams | Percent |
|---|---|---|
| Crab-flavored xanthan-soy (1:6) fibers* | 410 | 63.18 |
| White sauce** | 155.03 | 23.89 |
| Frozen whole eggs, thawed | 57.55 | 8.87 |
| Onion, granulated (McCormick) | 22.98 | 3.54 |
| Parsley flakes (McCormick) | 1.82 | 0.28 |
| Dill weed (McCormick) | 0.82 | 0.13 |
| Red pepper, ground (McCormick) | 0.73 | 0.11 |
|  | 648.93 | 100% |

*Same fibers as for extended crabmeat salad.
**The formula and procedure for preparing the white sauce are described below:

| Formula of White Sauce | Grams | Percent |
|---|---|---|
| Milk, whole 3.5% butterfat | 142.85 | 92.14 |
| Whey, nonhydroscopic, sweet and spray-dried powder | 6.05 | 3.9 |
| Salt, fine mesh | 1.81 | 1.17 |
| Mira-Cheer 340, dent corn starch (Staley) | 1.55 | 1.0 |
| Wheat flour | 1.55 | 1.0 |
| Xanthan gum (Keltrol) | 0.91 | 0.59 |
| Onion, granulated (McCormick) | 0.16 | 0.1 |
| White pepper G-300 (McCormick) | 0.12 | 0.08 |
| Paprika, ground, Pacific Beauty (Cal-Compak) | 0.03 | 0.02 |
|  | 155.03 | 100% |

Procedure for White Sauce (a) Dry blend all ingredients thoroughly.
(b) Add dry ingredients to cold milk in sauce pan while agitating milk with a whip.
(c) Heat to boiling over medium heat while stirring frequently.
(d) Let sauce boil for one minute while stirring constantly.

Procedure for Croquettes (a) Remove 15 g. of the white sauce from sauce pan while still very hot. Let cool slightly to 82° C. (180° F.) and blended with whole eggs.
(b) Add slightly cooled white sauce-egg yolk mixture to the rest of hot white sauce and simmer over low heat until sauce thickens to a stiff consistency.
(c) Remove sauce from heat and let cool to 66° C. (150° F.)
(d) In a large bowl, thoroughly mix, by hand, xanthan gum-soy protein fibers with King crabmeat (if desired), granulated onion, parsley flakes, dill weed and ground red pepper. Add slightly cooled white sauce and mix well by hand (approximately one minute).
(e) Place mixture in refrigerator for 30 minutes.
(f) The croquettes are prepared for deep fat frying by forming the cooled mixture into balls approximately one-inch in diameter. The balls are then breaded in a three step process; first dip in bread crumbs, second in egg wash and third in bread crumbs
(g) The breaded croquettes are then frozen.
(h) The frozen breaded croquettes are deep fat fried at 135° C. (275° F.) until golden brown.

Soy protein-xanthan gum-based lobster croquettes may be prepared in the same manner, except that the fibrous soy protein-xanthan gum complex is flavored with 2% (w/w) L. J. Minor's lobster base.

Soy protein-xanthan gum-based crab patties were prepared by blending the soy-xanthan (6:1) fibers with canned snow crabmeat by the following procedure: (a) blend the boiled and drain-dried soy-xanthan (6:1) fibers with 5% (w/w) Kraft's dried egg whites (b) mix thoroughly 70% soy-xanthan (6:1) fibers with 30% canned snow crabmeat in a Hobart blender. Add the broth in the can to the fiber mixture to enhance the flavor, (c) press the flavored soy-xanthan (6:1) fibers under 28 psi at 25° C. for 30 minutes, (d) heat the flavored and pressed pattie in a microwave oven at cooking setting for 2 minutes for every 150 g. pattie.

Hot Chicken Salad Based on Soy Protein-Xanthan Gum Fibers

Formula

¾ cup mayonnaise
2 tablespoons lemon juice
1 teaspoon dry mustard
1 teaspoon salt
1 teaspoon worcestershire
1 4-ounce package shredded cheddar cheese (1 cup)
3 cups soy protein-xanthan gum-based chicken analog [soy protein-xanthan gum=6:1, flavored with 2% H and R's "Taste of Chicken"]
1½ cups chopped celery
1½ cups fresh bread cubes
1 cup chopped california walnuts

Procedure

Preheat over to 350° F. In 1½ quart casserole, mix first five ingredients. Stir in half of cheese and remaining ingredients. Bake 40–45 minutes. Sprinkle with remaining cheese and bake 3 to 5 minutes longer until cheese is melted.

Soy Protein-Xanthan Gum-Based Italian Boneless Chicken

Formula 3 eggs, beaten
1 cup grated parmesan cheese
¼ cup fine dry bread crumbs
2 cups soy protein-xanthan gum (6:1) based chicken analog [The protein-gum fibers were flavored with 2% (w/w) H and R's "Taste of Chicken" pressed]
1½ tablespoons butter or margarine
¼ cup chopped green pepper
¼ cup chopped onion
1½ teaspoons cooking oil
1 15-ounce can tomato sauce
½ teaspoon sugar
¼ teaspoon Italian seasoning
⅛ teaspoon dried basil
⅛ teaspoon garlic powder
⅛ teaspoon pepper
1 cup shredded mozarrella cheese

Procedure

Combine eggs, parmesan cheese and bread crumbs. Stir in cubes of soy protein-xanthan gum (6:1) based chicken analog and mix well. With hands, shape mixture into eight ¾ inch thick patties. In a large skillet cook patties in butter or margarine over medium high heat for 2 to 3 minutes per side or until browned. Drain patties and arrange them in a 10×6×2 inch baking dish.

Cook green pepper and onion in hot oil until tender. Remove from heat. Add ½ cup water and all remaining ingredients except mozzarella cheese. Spoon sauce over patties. Sprinkle with mozzarella. Bake, uncovered, at 350° F. for 25 minutes or until hot.

Battered and Breaded Patties of Protein-Xanthan Gum (6:1)-Complex-Based Chicken Analog Cut up the chicken analog of the soy protein-egg albumin-xanthan gum (3:3:1) fibers (flavored with 2% H&R's "Taste of Chicken" and 5% Henningsen's chicken fat, pressed) into 0.6"×3.5"×3.5" patties.

Procedure

Prepare a tempura batter slurry by:
(a) Measure 2 cups of ice cold water into a large mixing bowl.
(b) Sprinkle 2 cups of tempura batter mix (Hime brand) evenly over water and then stir it until the flour is moistened and large lumps disappear.
Batter, bread and deep-fry the patties by:
(a) Dip the patties into the tempura batter and take them out when the patties are completely coated with the batter.
(b) Bread the battered patties with bread crumbs (Gonnella brand)
(c) Deep-fry the battered and breaded patties in frying oil (375° F.) with occasional turning until they turn light golden brown.

Protein-Xanthan Gum (6:1)-Complex Based Cashew Chicken Nuggets

Formula

½ cup corn starch
2 teaspoons salt
¼ teaspoons monosodium glutamate, optional
1 teaspoon sugar
1½ teaspoon dry sherry
2 egg whites
1½ cups finely grated cashew nuts
2 chicken breast size of soy protein-egg albumin-xanthan gum (3:3:1) complex based chicken analog (the protein-xanthan fibers were flavored with 2% (w/w) H&R's "Taste of Chicken" and 5% Henningsens's chicken fat, pressed)
2 cups vegetable or peanut oil Procedure (a) In a small bowl, combine corn starch, salt, monosodium glutamate, sugar and sherry.
(b) In a small bowl, beat egg whites slightly but not until frothy. Gradually and gently stir into sherry mixture.
(c) Place cashews (grate in blender) on platter. Dip chicken into sherry-egg mixture and roll in cashews. Place on wax paper or plate.
(d) Pour oil into wok and preheat, uncovered at 375° F. until signal on control goes off, about 4 minutes. Drop 4 to 8 dipped chicken sides, about 2 minutes. Remove with slotted spoon or strainer. Drain a few seconds and serve hot as appetizers or main dish. Makes about 32 appetizers or 6 main dish servings.

Protein-Xanthan Gum (6:1)-Complex Based Moo Goo Gai Pan

Formula

One half pound chicken analog of soy isolate-egg albumin-xanthan gum (3:3:1) complex (the fibrous complex was flavored with 2% (w/w) H&R's "Taste of Chicken" and 5% Henningsen's chicken fat and then pressed). A dash of salt and a dash of pepper.
1 teaspoon sherry
½ egg white
4 tablespoons oil
12 mushrooms, sliced
12 water chestnuts, sliced
2 or 3 inch long scallion
2 teaspoons soy sauce
½ teaspoon sugar
1 teaspoon corn starch
24 snow peas
1 teaspoon salt
2 stalks celery, slice
1 clove garlic, sliced Procedure (a) Slice the pressed fibers of the chicken-flavored complex of soy isolate, egg albumin and xanthan gum (3:3:1) and mix with sherry.
(b) String snow peas.
(c) Heat 2 tablespoons oil and add salt, saute mushrooms, celery water chestnuts and snow peas for 2 minutes. Remove from pan.
(d) Heat 2 tablespoons oil in sauce pan. Fry garlic, scallions and chicken analog for 1 minute over high heat. Add soy sauce and mix well. Add cooked vegetables and mix well for 1 minute. Remove to heated plate and it is ready to serve.

While the present invention has been described with respect to various specific embodiments, it will be appreciated that various modifications and adaptations may be made based on the present disclosure, which are regarded to be within the spirit and scope of the present invention.

Various of the features of the invention are set forth in the following claims.

What is claimed is:

1. A method for manufacturing edible protein fibers comprising the steps of providing an aqueous protein fiber generating solution comprising a solubilized edible protein component selected from the group consisting of soy protein, peanut protein, casein, egg protein, cottonseed protein, sunflower protein, pea protein and mixtures thereof, and a solubilized xanthan gum hydrocolloid component selected from the group consisting of xanthan gum, xanthan gum/hydrocolloid adducts and mixtures thereof, the weight ratio of said xanthan gum to said protein component being in the range of from about 1:4 to about 1:10, and the total weight of said solubilized edible protein component and said solubilized xanthan gum hydrocolloid component being in the range of from about 0.1 to about 4 weight percent, based on the total weight of said aqueous protein fiber generating solution, adjusting the pH of the fiber generating solution while mixing said solution to provide xanthan-protein fibers and a whey solution, and separating the fibers from the whey solution.

2. A method in accordance with claim 1 wherein the fibers have a pH in the range of from about 3 to about 6.

3. A method in accordance with claim 1 wherein said pH adjustment is carried out at a temperature in the range of from about 4° C. to about 100° C. at an ionic strength of less than about 1 molar.

4. A method in accordance with claim 1 wherein said fibers are stabilized by heating to a temperature of at least about 70° C.

5. A method in accordance with claim 4 wherein said fibers are blended with a salt-containing flavoring agent to provide a flavored meat simulating composition comprising at least about 1 weight percent of sodium chloride which retains its fiber integrity.

6. A method in accordance with claim 1 wherein said fibers having a hardness of at least about 100 Kg at a water content of at least about 50 weight percent.

7. A method in accordance with claim 1 wherein said solubilized edible protein component has an isoelectric point in the range of from about 4 to about 7.

8. A method in accordance with claim 1 wherein the total solids content of said aqueous protein fiber generating solution is less than twice the total weight of said edible protein component and said xanthan gum hydrocolloid component.

9. A method in accordance with claim 1 wherein said pH adjustment is carried out substantially simultaneously with a combining of an aqueous solution of said protein component and an aqueous solution of said xanthan gum hydrocolloid component.

10. A method in accordance with claim 1 wherein said fiber generating solution has a specific conductance of less than about 0.09 mho per centimeter.

11. A method in accordance with claim 1 wherein said fiber generating solution has a specific conductance in the range of from about 0.0004 to about 0.002 mho per centimeter.

12. A method in accordance with claim 1 wherein said protein component is selected from the group consisting of soy protein isolate, casein, egg protein and mixtures thereof.

13. An edible protein complex comprising xanthan gum and an edible protein component selected from the group consisting of soy protein, peanut protein, casein, egg protein, cottonseed protein, sunflower protein, pea protein and mixtures thereof in fiber form.

14. A edible protein complex in fiber form in accordance with claim 13 wherein said fibers comprise soy protein isolate.

15. An edible protein complex in fiber form in accordance with claim 14 comprising soy protein and at least one other protein selected from the group consisting of casein and egg protein.

16. A edible protein complex in fiber form in accordance with claim 13 having a moisture content of at least about 65 weight percent.

17. A simulated meat compostion comprising a complex of xanthan gum and an edible protein component selected from the group consisting of soy protein, peanut protein, casein, egg protein, cottonseed protein, sunflower protein, pea protein and mixtures thereof in fiber form, a binding agent and a flavoring agent.

18. A simulated meat composition in accordance with claim 17 comprising at least about one percent by weight sodium chloride.

* * * * *